Nov. 23, 1926.

J. E. JOHANSEN 1,608,319

CHILD'S VEHICLE

Filed Nov. 22, 1922

Inventor
John E. Johansen.

Patented Nov. 23, 1926.

1,608,319

UNITED STATES PATENT OFFICE.

JOHN E. JOHANSEN, OF BROOKLYN, NEW YORK.

CHILD'S VEHICLE.

Application filed November 22, 1922. Serial No. 602,499.

My invention relates to improvements in toys, and more particularly has reference to, and is illustrated in the accompanying drawings in its application to a toy horse adapted to be ridden and propelled by a child.

Figure 1:
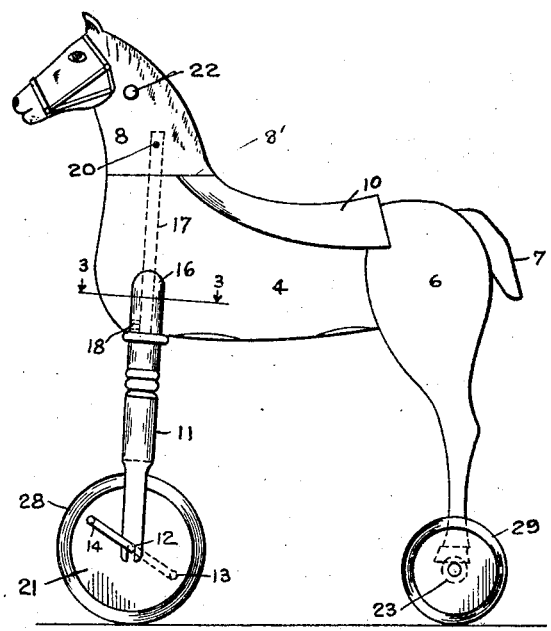
Figure 2:
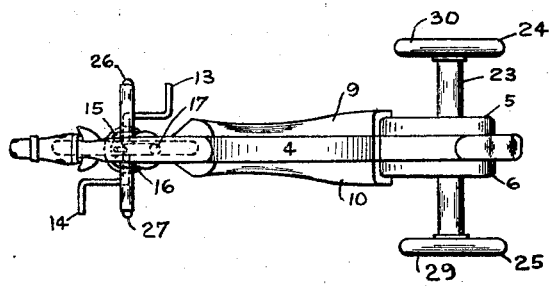
Figure 3:
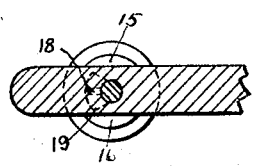

Referring to said drawings, Fig. 1 illustrates in side elevation, a toy horse constructed as a velocipede, embodying an application of my invention. Fig. 2 is a plan view looking down upon the same, and Fig. 3 a cross-sectional detail between the front support and body portion on the line 3—3 of Fig. 1.

The lower body portion of the horse is preferably cut out of a board substantially flat, with rounded edges, the same being indicated by reference character 4, 5, 6 indicate the hind legs of the horse also cut out of flat board-like sections suitably rounded and finished substantially as shown, and 7 indicates the tail which may also be a continuation of the body portion 4 or may be secured thereto as found desirable. The head portion 8 is also preferably cut from a section of board suitably carved or machined to represent a horse or other suitable animal and is provided with a level under surface or bearing as indicated at 8', and 9, 10 indicate other pieces between the body portion 4 and hind leg portions 5, 6, representing a saddle and serving as a proper seat or support for the child and at the forward end to provide level bearing or support for the head and neck portion. 11 indicates a suitable standard or post bifurcated at the bottom to provide bearing for the shaft 12 terminating in cranks or pedals 13, 14. Above the post 11 are preferably provided two pieces 15, 16, rounded to conform substantially to the diameter of the post 11, and providing additional support therefor by being glued or suitably fastened to opposite sides of the body portion 4. From the centre of the post 11 projects upwardly the rod 17 which may be turned therewith or secured therein, the same having a pin 18, shown to advantage in Fig. 3, adapted to move in the cut away portion 19 in the base of the body portion 6 as shown, for limiting the lateral movement or turning of the wheel. The laterally projecting ring between the post 11 and the ends 15, 16 serves as an additional base or support for the body of the horse as shown. Numeral 20 indicates a suitable pin through the neck of the horse and through the rod 17 for causing the head 8 of the horse to turn with the wheel 21 as the vehicle is steered. The rod 22 serving as a handle bar or steering means for the child to take hold of. At the back of the vehicle, a cross bar 23 may be provided to give support for the wheels 24, 25.

From the foregoing it will be observed that the entire body portion of the animal such as a horse may be made from a few small pieces of board or waste cuttings of a mill, producing an attractive looking and practical toy of harmless characteristics with which a small child can derive much enjoyment, as well as good exercise.

At the ends of the stick or handle bar 22, rubber buttons such as 26, 27 may be secured so that in case the horse falls over the head is thus protected from injury, and if desired the wheels may be provided with rubber tires such as indicated by reference characters 28 to 30 inclusive.

Of course it will be understood that various modifications may be made in the construction and arrangement of parts without departing from the spirit of the invention as claimed.

I claim:

In a toy of the class described, the body of an animal cut out of a substantially flat board extending in a vertical plane beneath the head and neck portion at one end thereof, hind leg portions similarly fashioned and overlaid said body portion on each side, saddle portions at each side of said body portion and partly extending beneath said neck portion providing bearing therefor, a rotatable standard for the front legs, part of said standard extending upwardly through said body portion and into said neck portion pivotally carrying the head and neck portions of the animal, a handle through said head, and wheels at the ends of said hind legs and said standard.

In testimony whereof I hereunto affix my signature.

JOHN E. JOHANSEN.